United States Patent
Sparks, II

(10) Patent No.: US 6,352,479 B1
(45) Date of Patent: Mar. 5, 2002

(54) INTERACTIVE GAMING SERVER AND ONLINE COMMUNITY FORUM

(75) Inventor: John Judson Sparks, II, Vallejo, CA (US)

(73) Assignee: nVidia U.S. Investment Company, Santa Clara, CA (US)

( * ) Notice: Subject to any disclaimer, the term of this patent is extended or adjusted under 35 U.S.C. 154(b) by 0 days.

(21) Appl. No.: 09/387,596

(22) Filed: Aug. 31, 1999

(51) Int. Cl.$^7$ ................................................ A63F 13/12
(52) U.S. Cl. .............................. 463/42; 463/40; 463/29
(58) Field of Search ............................ 463/40, 41, 42, 463/23, 29; 700/91; 709/228, 227, 223, 204

(56) References Cited

U.S. PATENT DOCUMENTS

| | | | | |
|---|---|---|---|---|
| 4,926,327 A | * | 5/1990 | Sidley |
| 5,558,339 A | * | 9/1996 | Perlman |
| 5,768,382 A | * | 6/1998 | Schneier et al. |
| 5,779,549 A | * | 7/1998 | Walker et al. |
| 5,813,913 A | * | 9/1998 | Berner et al. |
| 5,823,879 A | * | 10/1998 | Goldberg et al. |
| 5,828,843 A | * | 10/1998 | Grimm et al. |
| 5,838,909 A | * | 11/1998 | Roy et al. |
| 5,841,980 A | * | 11/1998 | Waters et al. |
| 5,846,132 A | * | 12/1998 | Junkin |
| 5,890,963 A | * | 4/1999 | Yen |
| 5,917,725 A | * | 6/1999 | Thacher et al. |
| 5,935,004 A | * | 8/1999 | Tarr et al. |
| 6,023,729 A | * | 2/2000 | Samuel et al. |

\* cited by examiner

*Primary Examiner*—Michael O'Neill
(74) *Attorney, Agent, or Firm*—Silicon Valley IP Group; Kevin J. Zilka

(57) ABSTRACT

A multiplayer game system is implemented over the WWW using a plurality of game servers dynamically linked to and controlled by a WWW server. The WWW server dynamically links game players who log on to a web site hosted by the WWW server as a function of game playing statistics for each game player which are stored in the WWW server. The game servers generate the game player statistics for each player during and/or after game play and upload the game player statistics to the WWW server. The WWW server matches game players to appropriate games currently being played on the game servers based on the skill level required by the game and the corresponding skill levels of other current players of that game as represented by the game player statistics stored by the WWW server and dynamically generates links for the game player to the appropriate games. The user can then select which game to play by choosing one of the dynamically generated links.

1 Claim, 15 Drawing Sheets

| ABOUT 3dfx | SCORES |
|---|---|

TUESDAY, APRIL 13, 1999

| RULES | | APRIL 1999 |
|---|---|---|

| SCHEDULE |
|---|

| SCOREBOARD |
|---|

```
            APRIL 1999
         S   M   T   W  TH   F  SA
                           1   2   3
         4   5   6   7   8   9  10
        11  12  13  14  15  16  17
        18  19  20  21  22  23  24
        25  26  27  28  29  30
```

TO VIEW THE MATCHES FOR
ANOTHER DAY, CLICK ON A
DATE ON THE CALENDER
ON THE RIGHT SIDEBAR

| LATEST SCORES |
|---|

FEBRUARY 1999
MARCH  1999

| GAME FILES |
|---|

| PRESS CENTER |
|---|

VOTE ON:    NO. OF CURRENT PLAYERS:

| FEATURES |
|---|

QUEST              2
QUEST II           10

| SPONSORS |
|---|

STARKICKER         0
DIABLO II          0

| PLAYER PROFILES |
|---|

JUNGLE             0
CHESS              0

| MESSAGE BOARD |
|---|

GO                 2

| NEWS |
|---|

[ SEARCH ]

3dfx
| YOUR EMAIL |

(SUBSCRIBE)
QUICK HELP
PLAYER SUPPORT
MASTER SCHEDULE

FIG. 7

| | |
|---:|:---|
| AKA: | NOXIOUS |
| REAL NAME: | JOHN DOE |
| ARCH-NEMESIS: | BUSBY |
| PREFERRED WEAPONS: | CHAINGUN |
| CONTROLLER: | MOUSE + KEYBOARD |
| PLAYS: | QUAKE 1, DOOM 2 |
| FAVORITE LEVEL: | Q2DM1 |
| HONORS/AWARDS: | TOP-RANKED QUALIFIER, ACTION CATEGORY, PGL SPRING '99 |
| BIRTHPLACE: | BANGKOK, THAILAND |
| RESIDENCE: | McLEAN, VA |
| AGE: | 28 |
| HOBBIES: | BASKETBALL, SNOW BOARDING, WIND SURFING |
| CONNECTION: | 56K MODEM |
| CPU SPEED: | 450MHZ |

FIG. 8

**AVAILABLE GAMES
FOR NOXIOUS**

| QUAKE | ~62

| QUAKE II | ~62

| DOOM 2 | ~62

FIG. 9

```
        SUBJECT:    BUSBY@3DFX.COM DEFEATS PSHAW
           FROM:    LADDER
           HOST:    3DFX
           DATE:    TUE APR 13 14:36:14
```

BUSBY                        LOSS    RATING=1052   PROB=47.8%   K=50
ADJ=-23
NOXIOUS (#949)            WIN     RATING=1067   PROB=52.2%   K=50
ADJ=23

ON MAP "THE LOST TEMPLE":

BUSBY WAS PROTOSS AND PLAYED FOR 26 MINUTES

OVERALL SCORE 42613
         22675 FOR UNITS
          4000 FOR STRUCTURES
        15938 FOR RESOURCES

UNITS SCORE 22675
          74 UNITS PRODUCED
        112 UNITS KILLED
         52 UNITS LOST

STRUCTURES SCORE 4000
        30 STRUCTURES CONSTRUCTED
         3 STRUCTURES RATED
        11 STRUCTURES LOST

RESOURCES SCORE 15938
        3888 GAS MINED
      12050 MINERALS MINED
      14760 TOTAL SPENT

NOXIOUS WAS TERRAN AND PLAYED FOR 26 MINUTES

OVERALL SCORE 65737
        30825 FOR UNITS
         8730 FOR STRUCTURES
        26182 FOR RESOURCES

UNITS SCORE 30825
        215 UNITS PRODUCED
         52 UNITS KILLED
       115 UNITS LOST

STRUCTURES SCORE 8730
        41 STRUCTURES CONSTRUCTED
        12 STRUCTURES RAZED
         3 STRUCTURES LOST

RESOURCES SCORE 26182
        4096 GAS MINED
      22086 MINERALS MINED
      20472 TOTAL SPENT

BUSBY'S RECORD IS NOW 3/2/0
NOXIOUS'S RECORD IS NOW 6/3/1

BUSBY WAS PLAYING FROM 203.228.6X.XXX
NOXIOUS WAS PLAYING FROM 210.108.24X.XXX

THIS GAME LASTED 26 MINUTES

FIG. 10

INTERACTIVE GAMING SERVER AND ONLINE COMMUNITY FORUM

BACKGROUND OF THE INVENTION

1. Field of the Invention

The system described relates to a method and apparatus for playing a video game among a plurality of players over a wide area network (WAN), such as the Internet, and, more particularly, to a method and apparatus for screening the players by means of personal game statistics.

2. Related Art

In recent years multiplayer, online video games have become popular. Multiple players at locations which are geographically remote from each other are simultaneously enabled to play a video game over a public WAN, such as the World Wide Web (WWW), or proprietary WANs, such as America On Line ("AOL") or the Microsoft Network ("MSN"). Typically such systems utilize a network server which operates the game being played. The individual players log onto the network server from their personal computers via the WAN using a graphical user interface (GUI). After entering a user name and a password, they are then enabled to play a game being hosted by the network server along with other players. See, for example, U.S. Pat. No. 5,841,980, entitled "Distributed System for Communication Networks in Multiuser Applications"; U.S. Pat. No. 5,823,879, entitled "Network Gaming System"; and U.S. Pat. No. 5,838,909, entitled "Reducing Latency When Synchronizing Access to a Multiuser Database over a Network." Another scheme involves directly connecting multiple players together via telephone lines after they have first logged into the network server and have been matched to each other. See U.S. Pat. No. 5,558,339, entitled "Network Architecture to Support Recording and Playback of Real-Time Video Games."

A problem arises in that the players often have differing skill levels and game attribute preferences. For example, one player may want to play "Quake" only against other players having a skill level at least equal to his or her own skill level. Also, a player may only want to be matched with other players using the same type of weapon, e.g. a so-called rail gun. Still other players may want to play as teams against other players or teams of players having a certain skill level. If the players themselves are allowed to catagorize their own skill level, then there is at least a non-uniformity in their evaluations and frequently outright misrepresentation. There exists a need for a system wherein players are only matched against other players according to their skill levels.

SUMMARY OF THE INVENTION

The above and other problems of prior art online multiplayer game systems are met by the present networked game system for allowing one or more users to interactively play games from individual user terminals via a network and which includes a network server that interfaces with the user terminals via the network and one or more game servers connected to the network server. Each game server runs at least one game having multiple levels of play and playable by a plurality of users simultaneously. The game server includes a statistics generator for generating statistics for each game player, that is each user playing a game, as the at least one game is being played. Each game server periodically supplies the game player statistics to the network server.

The network server receives the game player statistics and dynamically changes the interface with each user terminal depending upon the game player statistics of the user of that user terminal. For example, a plurality of game servers can be connected to the network server, each game server running a different game, and the network server dynamically links a user to a particular game server as a function of the user's game player statistics. The network server also limits which levels of play a user may enter depending upon the user's game player statistics as supplied by the game server. The network server also determines characteristics attributable to each game player, including, but not limited to, weapons available for use by the game player, based on the user's game player statistics.

In most cases, the network is the world wide web (WWW), the network server is a WWW server, and the WWW server uses a graphical user interface (GUI) to interface with the user terminals via the WWW. The user can input preferences through the GUI with respect to aspects of the game to be played and the WWW server links a user to a particular game server as a function of both the input preferences and the user's game player statistics. The preferences can include a level of skill of other game players simultaneously playing a game as reflected by their game player statistics.

The users interfacing with the WWW server can input an election as to a preferred game to be played, and the WWW server controls the game server to load a game elected by the majority of users.

The WWW server and the game server can be either physically proximate to each other and directly connected together or geographically remote from each other and the WWW server interfaces with the game server via the network.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 7 is an illustration of the entry web page of the WWW server.

FIG. 8 is an illustration of a user's personal profile page.

FIG. 9 is an illustration of a personal game list page.

FIG. 10 is an illustration of a game play statistics report.

DETAILED DESCRIPTION OF THE PREFERRED EMBODIMENT

Figure 1:
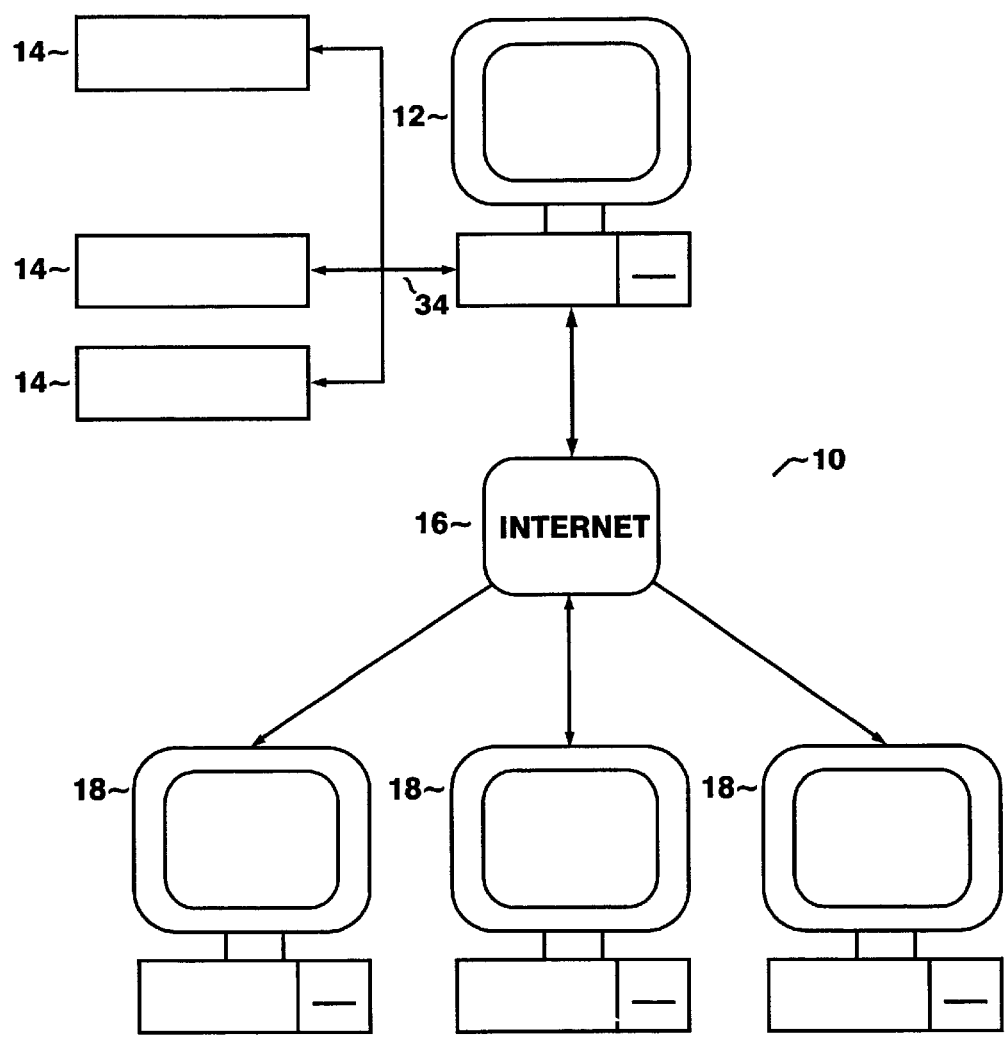
FIG. 1 illustrates a plurality of computer systems connected in a network configuration.

Referring now to FIG. 1, a network configuration in which the present invention may be implemented is illustrated. A WWW server 12 is coupled via a wide area network such as the Internet 16 to a number of user computer systems 18. The term "Internet" as used herein is to be understood as including the World Wide Web (WWW). The WWW server 12 is linked to a plurality of game servers 14 via links 34 which can be the Internet or direct links or both. Each game server 14 and each of the user computer systems 18 includes stored game software, including software in which the present invention is embodied. The game software includes various application program interfaces (APIs) providing an interface to operating system software. Additionally, each computer system 18 is loaded with a WWW browser program and/or game software that provides WWW access.

Figure 2:
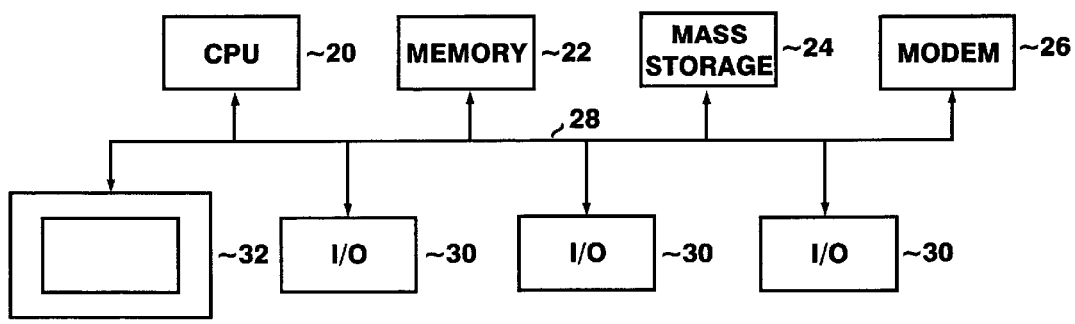
FIG. 2 is a block diagram of a computer system in which the present invention can be implemented.

FIG. 2 illustrates an example of an architecture which may be used for any of the user computer systems 18 or the WWW server 12. The architecture includes a central processing unit (CPU) 20, memory 22, a mass storage device 24, a modem 26, and various input/output (I/O) devices 30. Memory 22 represents both random access memory (RAM) and read-only memory (ROM). Mass storage device 24 includes an optical, magnetic, or other similar hard disk drive (HDD) or floppy disk drive (FDD) storage medium suitable for use with a computer system. I/O devices 30 may include any combination of devices such as a mouse, a joystick, a trackball, a keyboard, or other I/O devices. The software in which the present invention is embodied may be stored in mass storage device 24, memory 22, or both. In addition, the software may be distributed between two or more of the computer systems illustrated in FIG. 1.

Figure 3:
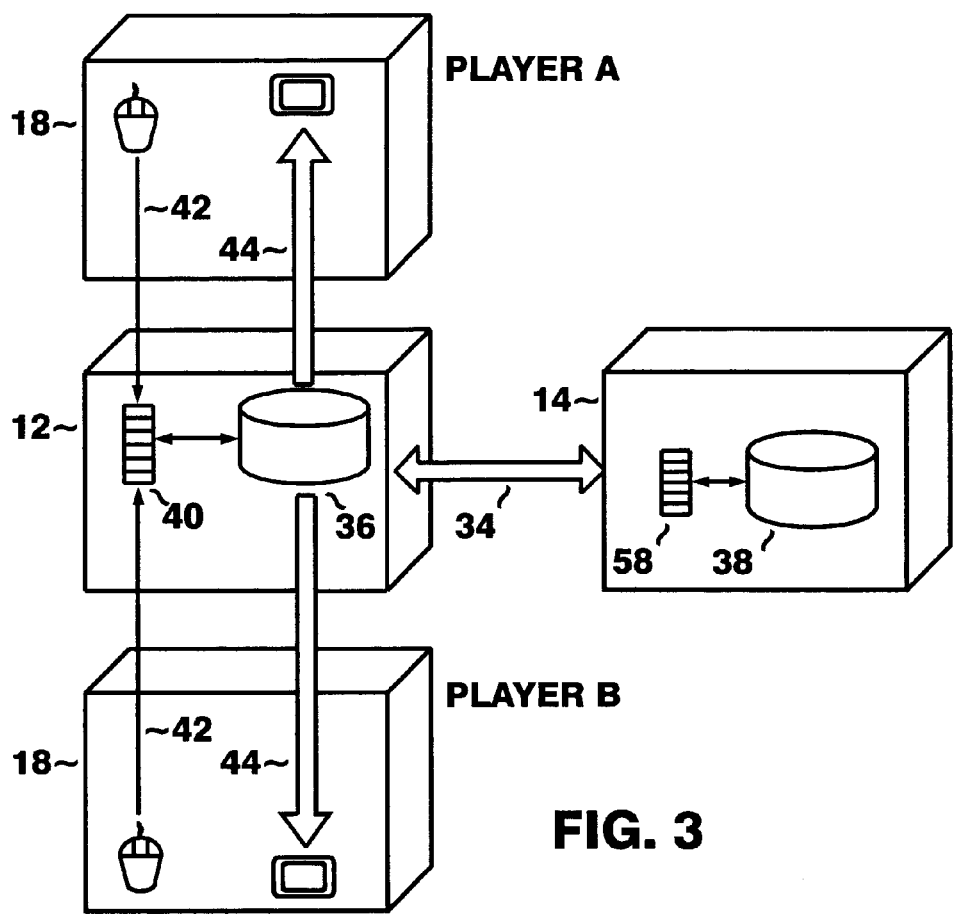
FIG. 3 illustrates a multi-player game running in a network using a user-server configuration.

FIG. 3 shows a configuration according to the present invention for implementing a multiuser game on a network. Only one game server 14 is shown, but it is to be understood that a plurality of such game servers 14 are linked to the WWW server 12. The WWW server 12 can be programmed with a suitable web server program such as Apache ver. 1.3.4 or later versions, available in the IIS Web Server software available from Microsoft Corporation. The game world is provided by a database in a database 38 located in each game server 14. Also located on each game server 14 is a statistical program for keeping track of the statistics for each game player. These statistics can include not only which player won the game but also how many opponents, both real and virtual, were destroyed and what weapon was used to destroy them. Such statistics programs are commercially available. For example, compatible with the multiplayer video game "Quake" and "Quake II", which is manufactured and sold by id Software, Inc., Town East Tower, 18601, LBJ Freeway, Suite 615, Mesquite, Tex. 75150, is a statistical program called "Gibstats," available for downloading from the Internet.

It should be understood that there are other commercially available statistics programs, e.g., the ngTCS™ tournament control system from NetGames USA available on the Internet, which could be substituted for the Gibstats program.

The statistics program generates display data for a player vs. player matrix, ranking, direct player vs. player compare, single player analysis, high score summary, clan tables and CTF team score tables. These displays can be sorted by kills, deaths, frags, suicides, skill, efficiency, relative frags, maps played and all CTF scores. An example of a report which can be generated using such a statistics program is shown in FIG. 10. The data can be generated periodically or at the end of each game by the game server programmed with the statistics program. The statistics file is generated as a delimited text file. Periodically the WWW server 12 sends a request to the game server 14 for the statistics files for the game players playing the game being run (or just completed) on the game server 14. The statistics file is uploaded to the WWW server 12 and stored on the hard disk drive 36.

User computer system 18 are used by two (or more) players A and B of the game. Software 40 located in the WWW server 12 receives inputs 42 via the Internet 16 from the I/Os 30 (e.g., mouse clicks or joy stick inputs) of computers 18 and provides these inputs via the link 34 to the game software 58 in the game server 14 having a database 38 in order to update the game world. Rendering commands 44 are then sent from the updated database 38 in the game server 14 via the link to the WWW server 12 and across the Internet 16 to update the displays 32 of the player's computers 18.

Figure 4:
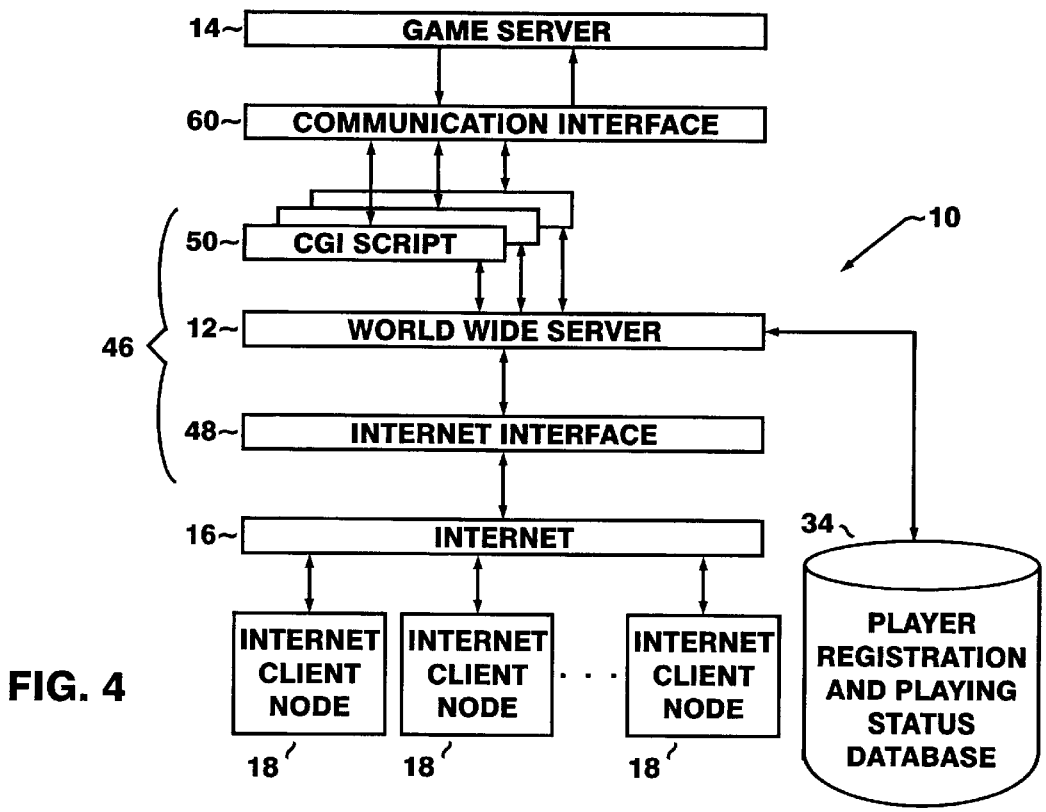
FIG. 4 is a block diagram of the multi-player game system of FIG. 3 illustrating in more detail the incorporation of the Internet.

More particularly, and with reference now to FIG. 4, a hosting web site 46 includes an Internet interface 48 for receiving and supplying communications between the Internet 16 and the remainder of the web site 46. The Internet interface 48, in turn, communicates with WWW server 12: (a) for validating and/or initiating registration of web site users (e.g., game players) at web site 46; and (b) for interpreting Internet requests for routing and/or activating web site 46 modules that can fulfill such requests. Thus, the WWW server 12 may access the database 34 for determining the registration identity of, for example, a game player. Additionally, upon receiving user registration confirmation regarding an Internet (e.g., World Wide Web) request, the WWW server 12 activates instantiations of modules known as common gateway interface (CGI) scripts, each CGI script 50 instantiation (or, for simplicity, each such instantiation also being referred to as a CGI script 50) being: (a) for interpreting and processing Internet requests according to the semantics of a web site 46 application associated with the CGI script; and (b) for constructing Internet responses for output from the associated application. Thus, there are one or more common gateway interface modules provided wherein each CGI script 50 (instantiation) invokes the game server 14 to process a single Internet game request from an Internet user's PC 18 where a player is playing game, and subsequently the CGI script 50 constructs an appropriate Internet response from the output received from the game server 14.

Figure 5A:
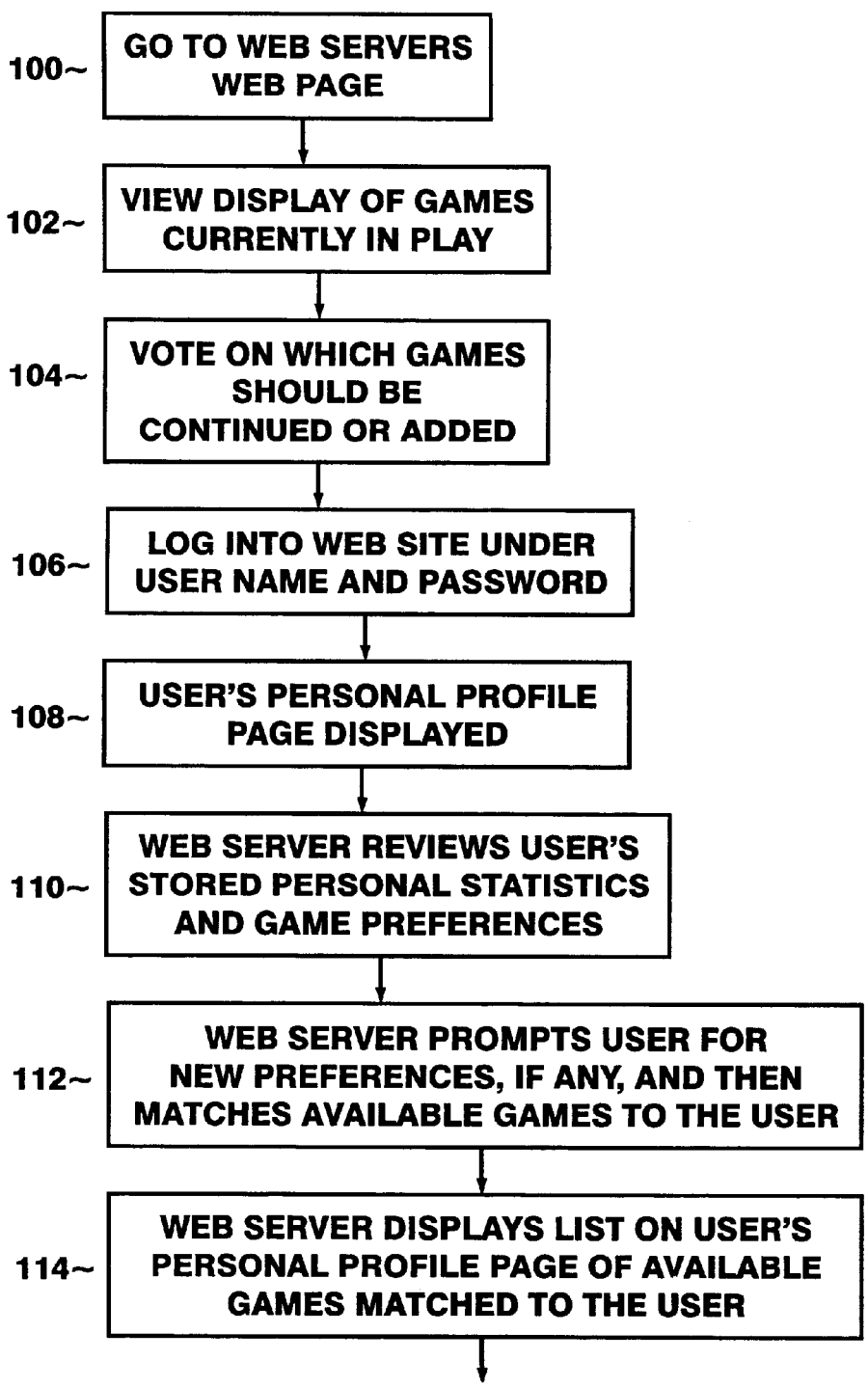
FIGS. 5A and 5B are a flow chart of the process followed by the WWW server according to the present invention.
Figure 5B:
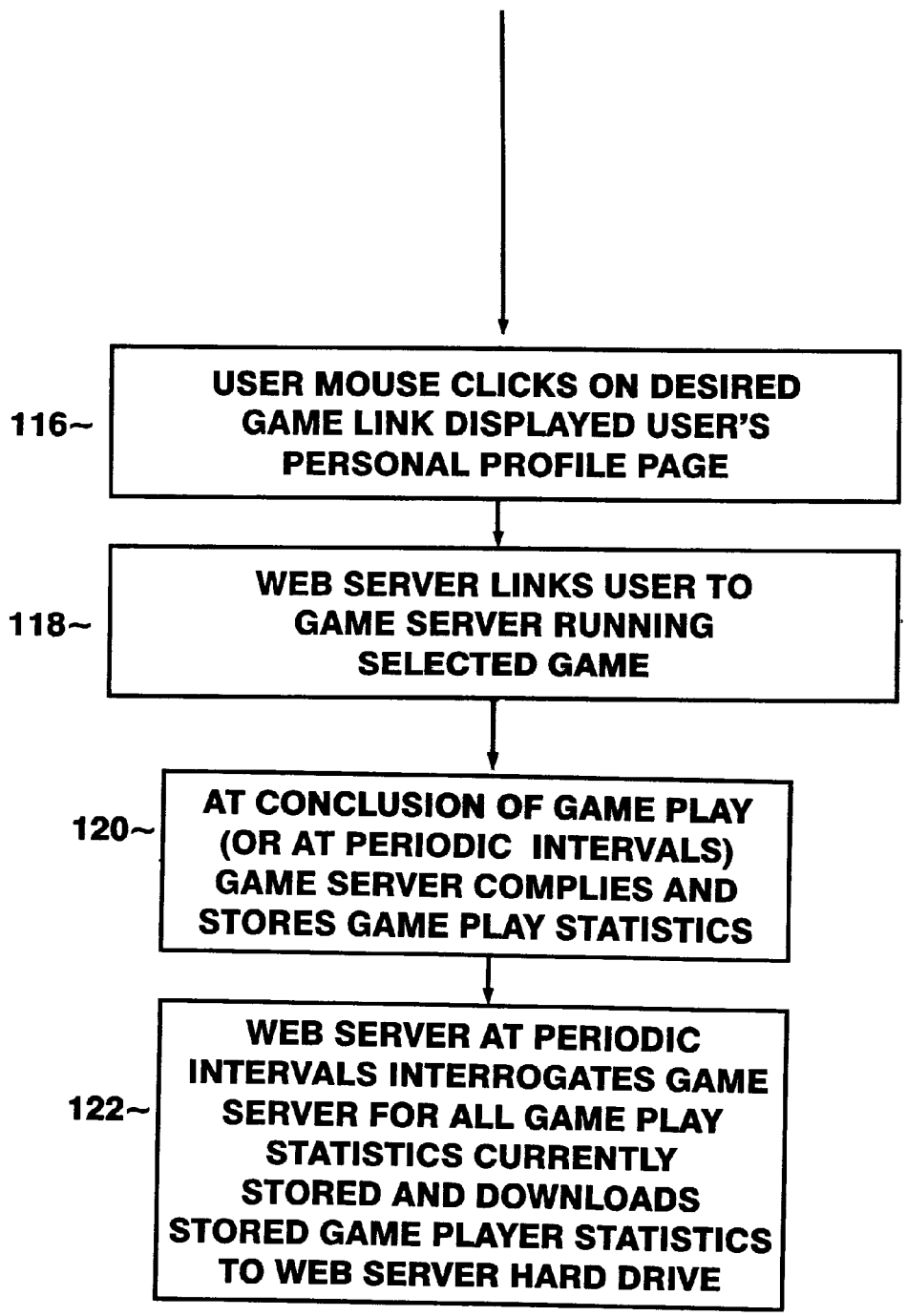

Referring now to FIGS. 5A and 5B, the CPUs 20 of the WWW server 12 and the user PCs 18, respectively, carry out the following steps. In a first step 100, each user causes his or her PC 18 to go to the host WWW site 46 of the WWW server 12. This can be done either by means of the WWW browser or through the game software loaded in the user's PC 18. The user views on his or her monitor 32 at step 102 the display of games currently in play as displayed at the host web site 46 by the WWW server 12. This view is illustrated in FIG. 7. The display shown in FIG. 7 and generated in step 102 includes a graphical user interface (GUI) in the form of links (constituted by the game name in the display) which can be selected by a mouse click to vote on games which the user would like to play. The list includes not only games in play (along with a display of how many people are currently playing each game) but also other games available for playing but which are not in current use.

At step 104, the user, using a mouse, joystick or other such I/O device 30 to generate a command sent over the Internet 16, positions a cursor on the links for the games of the user's choice and makes his or her election by clicking on a button on the I/O device 30. This sends an election command to the WWW server 12 over the Internet 16. The WWW server 12 periodically, in response to an accumulation of such election results from the users or in response to the ending of games currently in play, commands the game servers 14 to unload the canceled games, load new games, and restart the continued games (one game to each game server). These commands are sent via the link 34.

The user, via his or her programmed PC 18, logs into the web site 46 under the user's user name and password at step 106. In response to these entries, the WWW server 12 displays the user's personal profile page at step 108. FIG. 8 illustrates a user's personal profile page. The personal profile page lists the user's game name ("AKA"), real name, arch-nemesis players, preferred weapons, type of I/O device 30, games played, honors/awards, miscellaneous personal information, and miscellaneous hardware information pertaining to the user's PC. The information in FIG. 8 is to be considered merely an example and other or different information could also be included.

At step 110, the WWW server 12 reviews the user's previously stored personal statistics and game preferences. This information was obtained during a previous initial visit and subsequent visits by the user to the web site 46. The WWW server 12 prompts the user for new preferences, if any. The user enters any new preferences, such as a preferred type of new game or a new weapon. The WWW server 12 then uses this information to match the available games on the game servers 14 to the user at step 112.

At step 114, the WWW server 12 displays a list of the available games on the user's personal profile page as matched to the user. FIG. 9 is an illustration of such a list of available games for a given player. Each listed game in FIG. 9 constitutes a dynamic link to a game server 14 which is running the corresponding game listed. This dynamic link is generated at step 114. Suitable software for generating dynamic web page links is the active server pages (ASP) script for Microsoft Corporation's IIS Web Server software program.

The user mouse clicks on a desired game link displayed on his or her personal profile page at step 116, and the WWW server 12 links the user to the game server 14 running the selected game at step 118.

At the conclusion of the game play by the user, or at a periodic interval, the game server 14 running the game on which the user is playing runs the statistics program and compiles and stores game play statistics for each player in the HDD 38 at step 120.

At step 122, the WWW server 12, at periodic intervals, interrogates all the game servers 14 for all game play statistics currently stored. The WWW server 12 retrieves this information, for example, in the form of a delimited text file provided over the link 34, downloads the stored game players statistics, and stores them on the WWW server HDD 36.

Figure 6A:
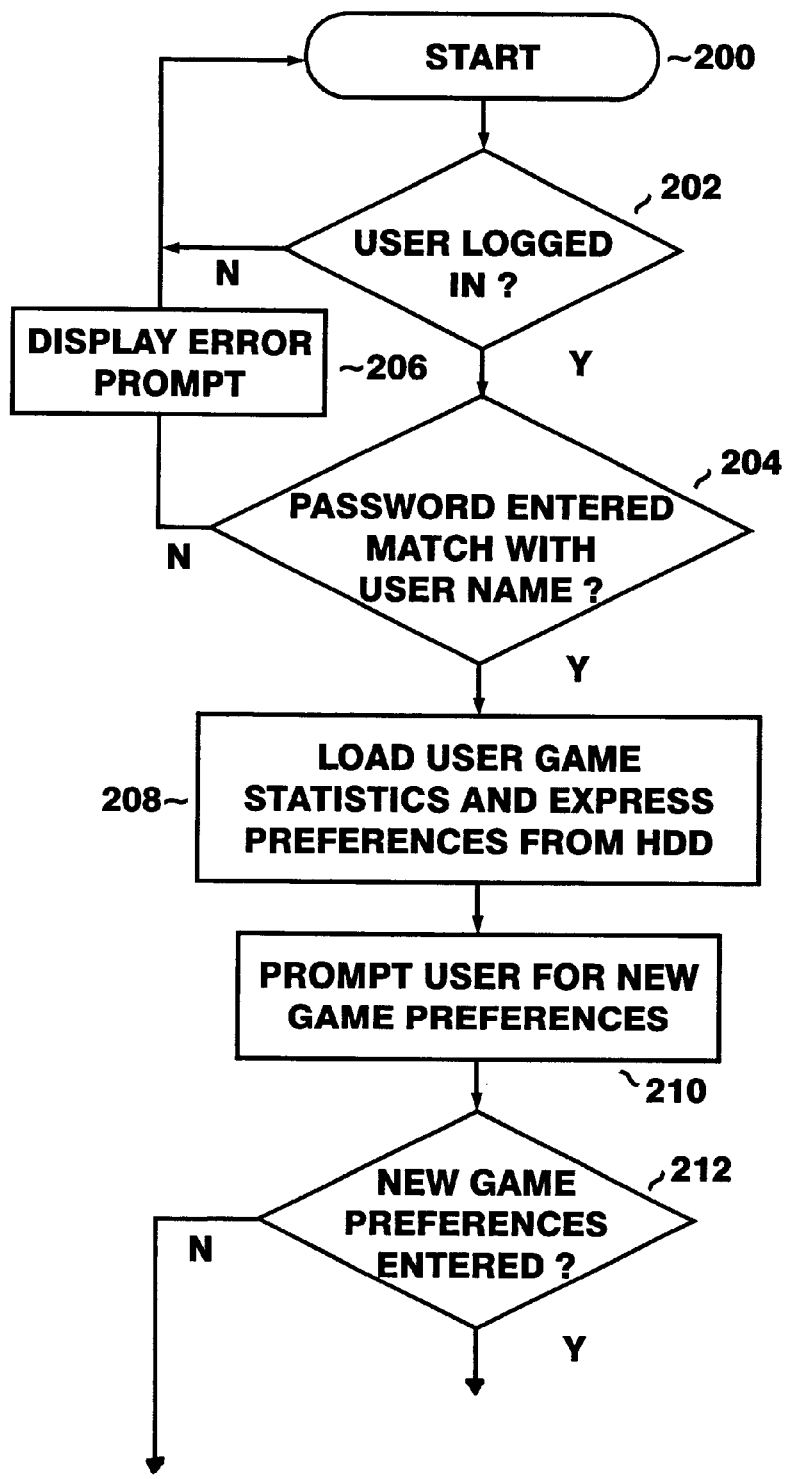
FIGS. 6A and 6B are a more detailed flow chart of the steps 106 to 118 of the flow chart depicted in FIGS. 5A and 5B.
Figure 6B:
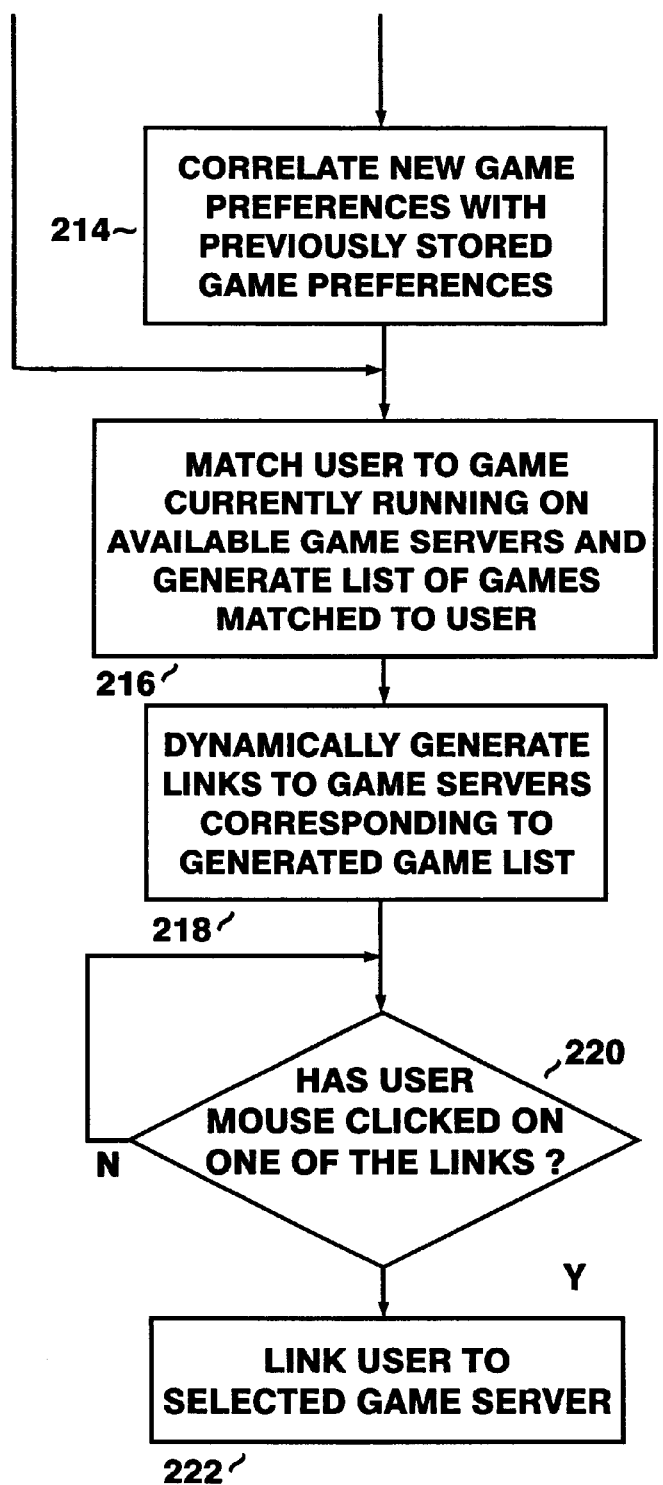

Referring now more particularly to FIGS. 6A and 6B, a flow chart illustrating the process followed by the WWW server 12 in completing the steps 106–118 of FIGS. 5A and 5B is shown. The process starts at step 200. At step 202, the WWW server 12 determines whether or not a user is logged in. If not, the step 202 is repeated. If the user is logged in, the WWW server 12 proceeds to step 204 where it determines whether the password entered by the user matches with the user name. If the answer is "no," an error prompt is displayed at step 206, and the process returns to step 202. A suitable error prompt might be, "PASSWORD REJECTED, PLEASE ENTER CORRECT PASSWORD."

Assuming that the password does match the user name at step 204, the WWW server 12 proceeds to step 208 where the user game statistics for the particular user logged on are loaded from the hard disk drive 36 into the CPU 20 of the WWW server 12, along with the user's expressed preferences. The WWW server 12 prompts the user to enter new preferences, e.g., preferred games, weapons, skill levels of opposing players, at step 210.

At step 212, the WWW server 12 checks to see if any user preferences have been entered by the user. That is, the WWW server 12 checks to see if the user has used his or her I/O device 30 to send commands or data indicating new user preferences via the Internet 16 to the WWW server 12. If no new user preferences are detected, the WWW server precedes to step 216. If new user preferences are detected, the WWW server procedes to step 214. At step 214, the WWW server 12 correlates the new game preferences expressed by the user with previously stored game preferences for that user and generates and stores a new set of preferences for that user.

The WWW server 12 procedes to step 216 where it matches the user to games currently running on available game servers 14 and generates a list of games matched to the user. The WWW server does the matching according to an algorithm to be discussed in greater detail hereinafter in regard to FIGS. 11A and 11B. Suffice to say, the matching operation compares the user's skill level, as represented by his or her game statistics, with a minimum skill level required by each available game, with the skill levels of other users currently playing each game, the expressed preferences of the user, the expressed preferences of the other users playing each game, and makes a determination of a best fit for the user to one or more of the games currently being run on the game servers 14. As explained previously, this list of games is displayed on the user's personal profile page at step 114 of FIG. 5A.

At the next step 218, the WWW server 12 dynamically generates links 62 to the game servers 14 which correspond to the generated game list which is displayed on the user's personal profile page. As explained above, suitable software for carrying out this step is the ASP script available from Microsoft Corporation. At step 220, the WWW server 12 determines whether or not the user has made an election of a particular game on the personal profile page by clicking the mouse when the user's cursor is positioned over one of the game links 62. If no selection is detected, step 220 is repeated. If a particular game has been elected by the user, then the WWW server 12 proceeds to step 222 where it links the user to one of the selected game servers as represented by the selected link 62.

Figure 11A:
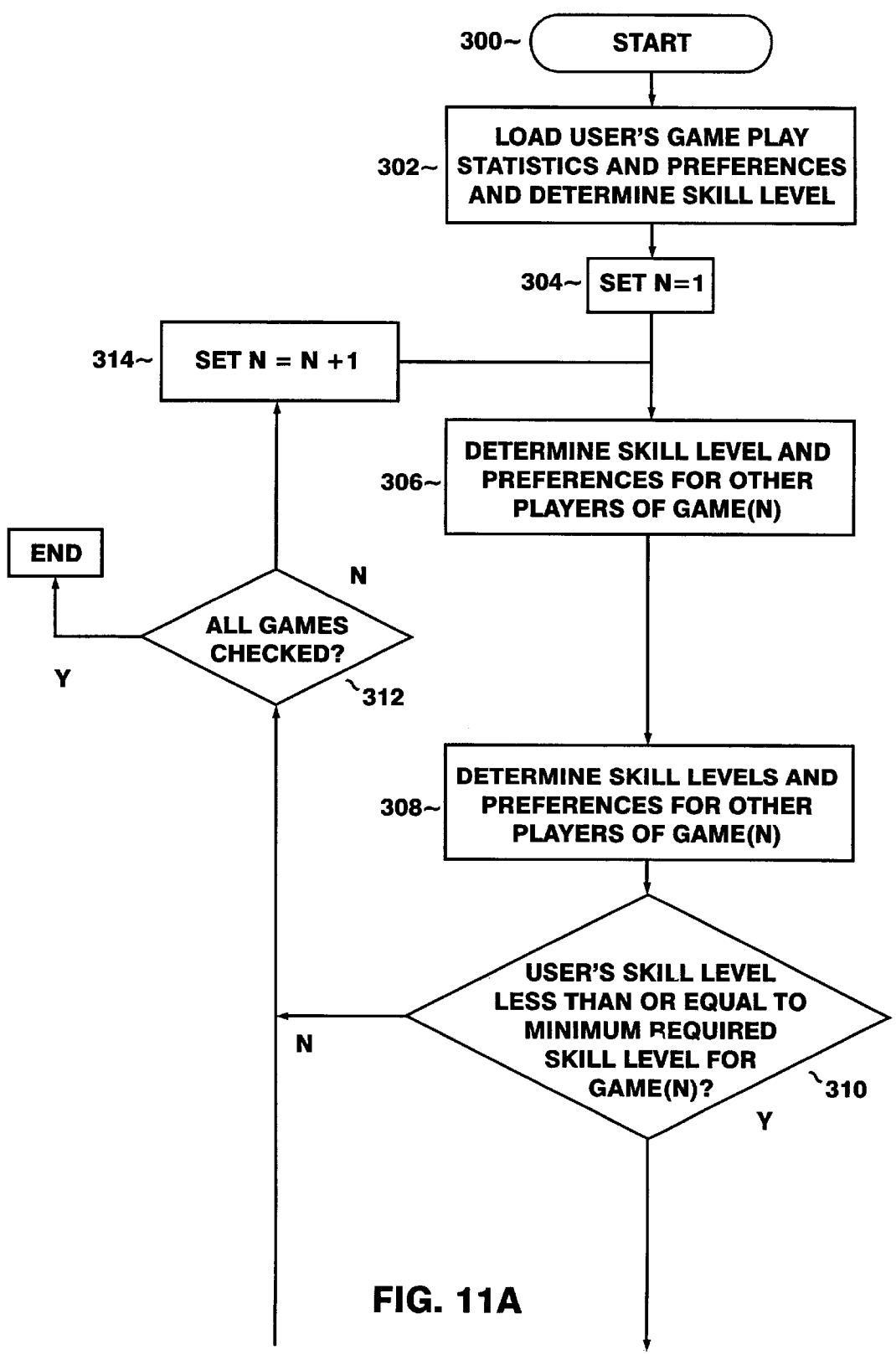
FIGS. 11A and 11B together are a flow chart of the process followed by the WWW server in matching a game on a game server to a particular user.
Figure 11B:
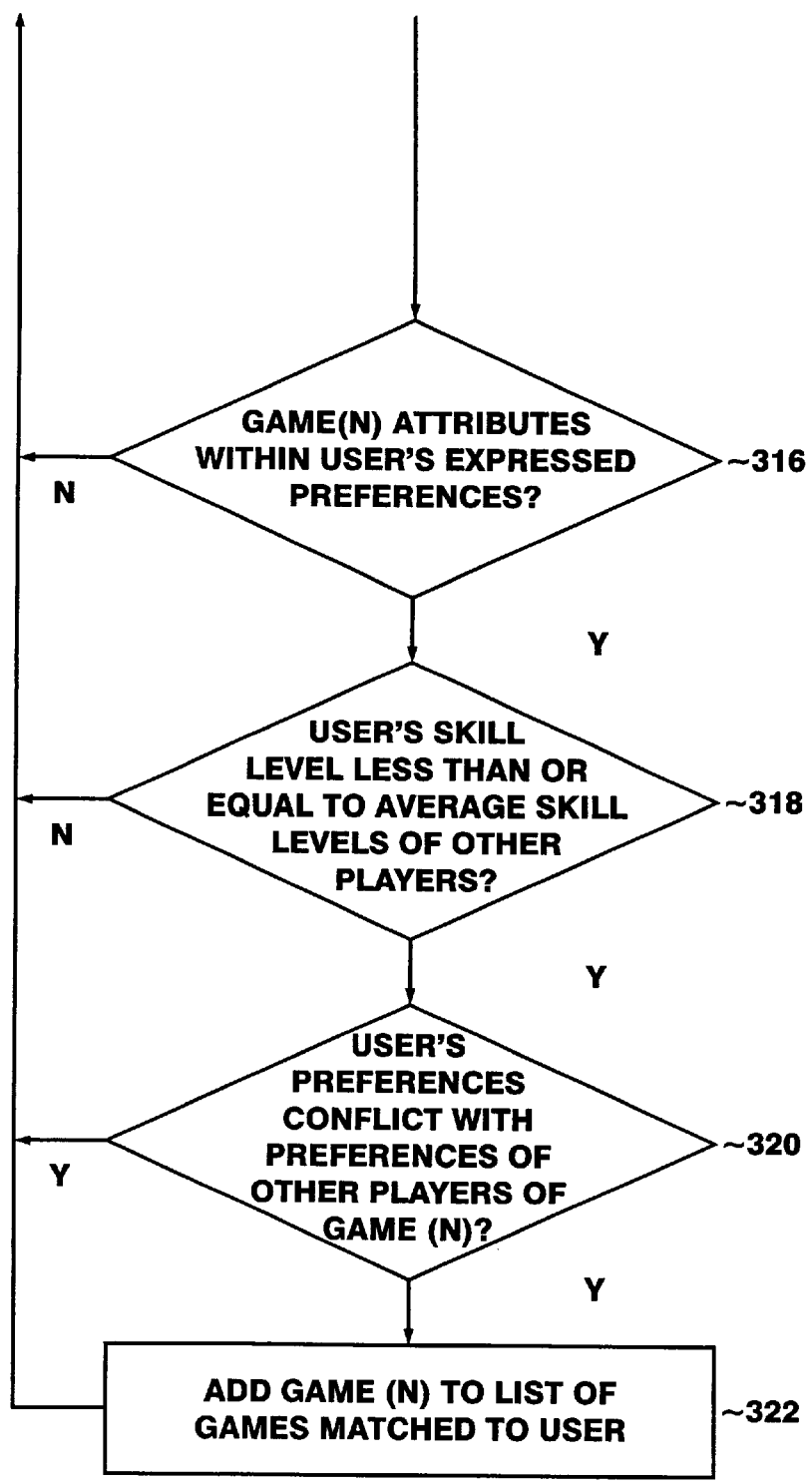

Referring now to FIGS. 11A and 11B, one suitable algorithm followed by the WWW server 12 in matching the user to games on the game servers at steps 112 (FIG. 5A) and 216 (FIG. 6B) is illustrated. It is to be understood that this algorithm is only one of many such algorithms which could be utilized and it is to be considered merely an example. After starting the algorithm at step 300, the WWW server 12 loads the user's game play statistics and preferences from the HDD 36 at step 302 and determines from the game play statistics the user's relative skill level for each one of the possible games to which the player could be matched. This determination is made by comparing the user's relative successes during previous attempts at playing each game.

The WWW server 12 sets a counter flag N to 1 at step 304. At the next step 306, the WWW server 12 determines the game name and the minimum skill level required for playing the game currently being run on game server (N), where N is an integer and represents the designation of the game server known to the WWW server 12. At step 308, the WWW server 12 determines the skill levels and obtains the preferences for each of the other players currently playing the game on game server (N).

At step 310, the WWW server 12 determines if the user's skill level is greater than or equal to the minimum skill level required to play the game on game server (N). If the answer is no, the WWW server 12 proceeds to step 312. At step 312, the WWW server 12 determines if all game servers have been checked. If the answer is yes, the algorithm is ended. If not, the WWW server 12 proceeds to step 314 where N is incremented by one, and the step 306 is thereafter repeated.

If the determination at step 310 is yes, the WWW server 12 goes to step 316 where the WWW server 12 determines if the attributes of the game on the game server (N) are within the user's expressed preferences. For example, the WWW server 12 determines if the game allows a choice of weapons preferred by the user or has scenarios preferred by the user. If the answer is yes, the WWW server 12 moves on to step 318. If the answer is no, the WWW server 12 goes to step 312.

At the next step 318, the WWW server 12 determines if the user's skill level is greater than or equal to the average of the skill levels of the other current players of the game running on game server (N). If not, step 312 is executed. If so, the WWW server 12 moves to step 320. At step 320, the user's preferences are checked for conflicts with the expressed preferences of the other current players of the game running on game server (N). For example, some of these players may have expressed a preference for not playing with other players who use a particular type of weapon. If there are conflicts, step 312 is executed, and if there are no conflicts, the WWW server 12 proceeds to step 322.

At step 322, the WWW server 12 adds the game running on game server (N) to the list of games matched to the user and step 312 is executed. This process repeats until all of the currently running games have been checked.

In the above described preferred embodiment, the operations are automated, for example, determining which games are to be loaded on the game servers 14 as a function of the outcome of a vote by the users. In much less advantageous embodiments, this particular step could be performed manually.

Figure 12:
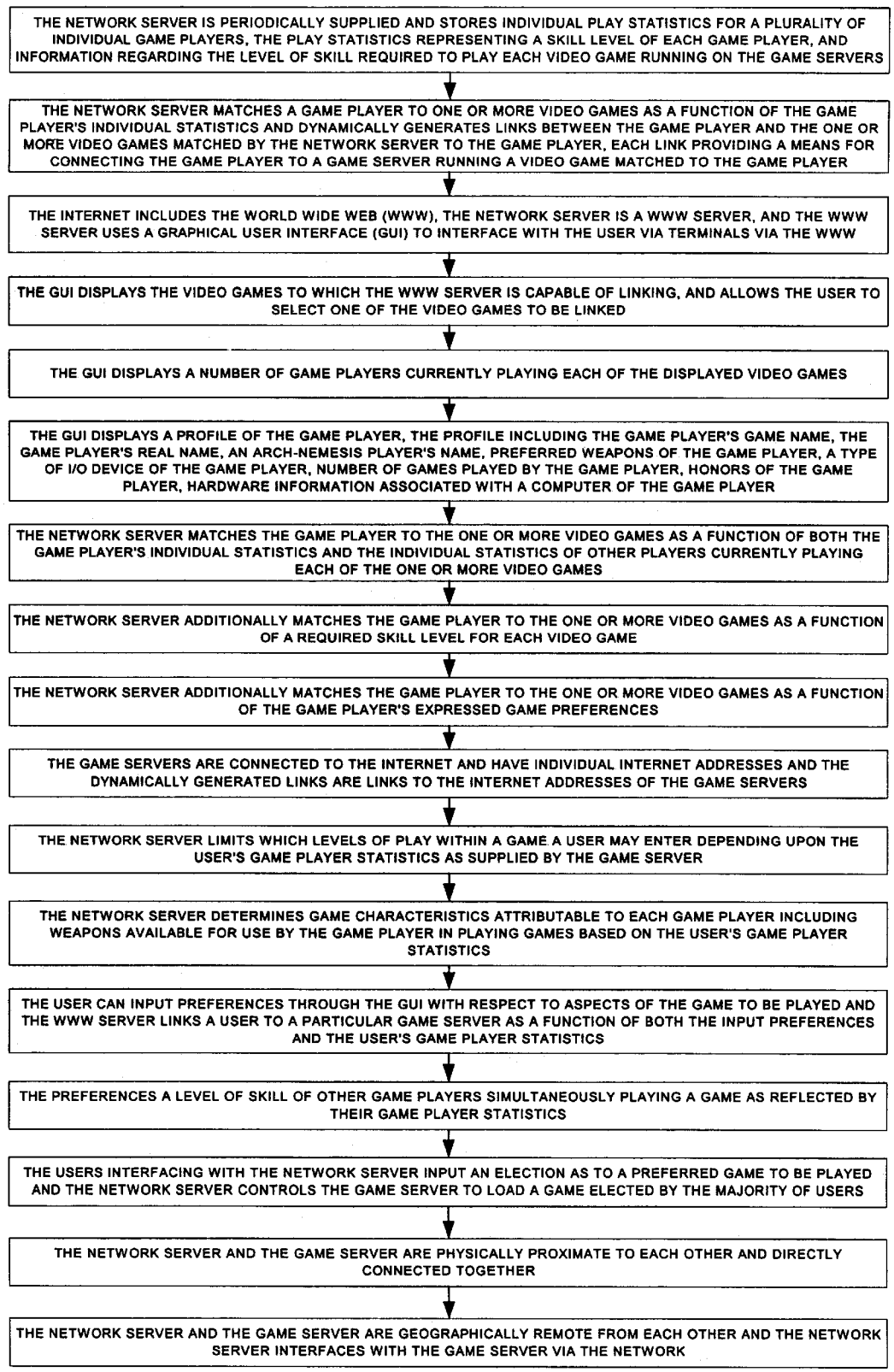
FIG. 12 illustrates a summary of various features of the present invention.

FIG. 12 illustrates a summary 1200 of various features of the present invention.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A multiplayer game system played over the Internet comprising:
   a plurality of game servers, each game server running a different video game;
   a network server linked to the game servers and connected to the Internet, and
   one or more game players connected to the Internet;
   wherein the network server is periodically supplied and stores individual play statistics for a plurality of individual game players by sending requests for the statistics to the game servers at periodic intervals, the play statistics representing a skill level of each game player, and information regarding the level of skill required to play each video game running on the game servers;
   wherein the statistics are capable of being outputted in the form of a report;
   wherein the network server matches a game player to one or more video games as a function of the game player's individual statistics and dynamically generates links between the game player and the one or more video games matched by the network server to the game player, each link providing a means for connecting the game player to a game server running a video game matched to the game player;
   wherein the Internet includes the world wide web (WWW), the network server is a WWW server, and the WWW server uses a graphical user interface (GUI) to interface with the user via terminals via the WWW;
   wherein the GUI displays the video games to which the WWW server is capable of linking, and allows the user to select one of the video games to be linked;
   wherein the GUI displays a number of game players currently playing each of the displayed video games;
   wherein the GUI displays a profile of the game player, the profile including the game player's game name, the game player's real name, an arch-nemesis player's name, preferred weapons of the game player, a type of I/O device of the game player, number of games played by the game player, honors of the game player, hardware information associated with a computer of the game player;
   wherein the network server matches the game player to the one or more video games as a function of both the game player's individual statistics and the individual statistics of other players currently playing each of the one or more video games;
   wherein the network server additionally matches the game player to the one or more video games as a function of a required skill level for each video game;
   wherein the network server additionally matches the game player to the one or more video games as a function of the game player's expressed game preferences;
   wherein the network server matches the game player to the one or more video games by:
      (a) loading the game player's individual statistics and the game player's expressed game preferences,
      (b) determining a skill level of the game player by comparing the game player's relative successes during previous attempts at playing each game,
      (c) setting a counter flag to one (1), the counter flag representing a designation of a current game server,
      (d) determining a name of a game associated with the current game server, and a minimum skill level required for playing the game on the current game server,
      (e) identifying the skill level and preferences of other players currently playing the game on the current game server,
      (f) adding the game to a list on the GUI if the skill level of the game player is greater than the minimum skill level for the game, if attributes of the game comply with the game player's expressed game preferences, if the skill level of the game player is greater than an average of the skill levels of the other players currently playing the game on the current game server, and if the game player's expressed game preferences comply with the preferences of the other players currently playing the game on the current game server, (g) determining whether another game server can be checked, and (h) incrementing the counter flag by one and repeating (d)–(h) if it is determined that another game server can be checked;

wherein the game servers are connected to the Internet and have individual Internet addresses and the dynamically generated links are links to the Internet addresses of the game servers;

wherein the network server limits which levels of play within a game a user may enter depending upon the game player's individual statistics as supplied by the game server;

wherein the network server determines game characteristics attributable to each game player including weapons available for use by the game player in playing games based on the user's game player statistics;

wherein the user can input preferences through the GUI with respect to aspects of the game to be played, and the input preferences and the game player's individual statistics are correlated after which the WWW server links a user to a particular game server as a function of both the input preferences and the user's game player statistics;

wherein the preferences a level of skill of other game players simultaneously playing a game as reflected by their game player statistics;

wherein the users interfacing with the network server input an election as to a preferred game to be played and the network server controls the game server to load a game elected by the majority of users;

wherein the network server and the game server are physically proximate to each other and directly connected together;

wherein the network server and the game server are geographically remote from each other and the network server interfaces with the game server via the network.

* * * * *